Feb. 26, 1957 V. E. JONES ET AL 2,782,943
MOBILE APPARATUS FOR HARVESTING CROPS
Filed May 3, 1954 3 Sheets-Sheet 1
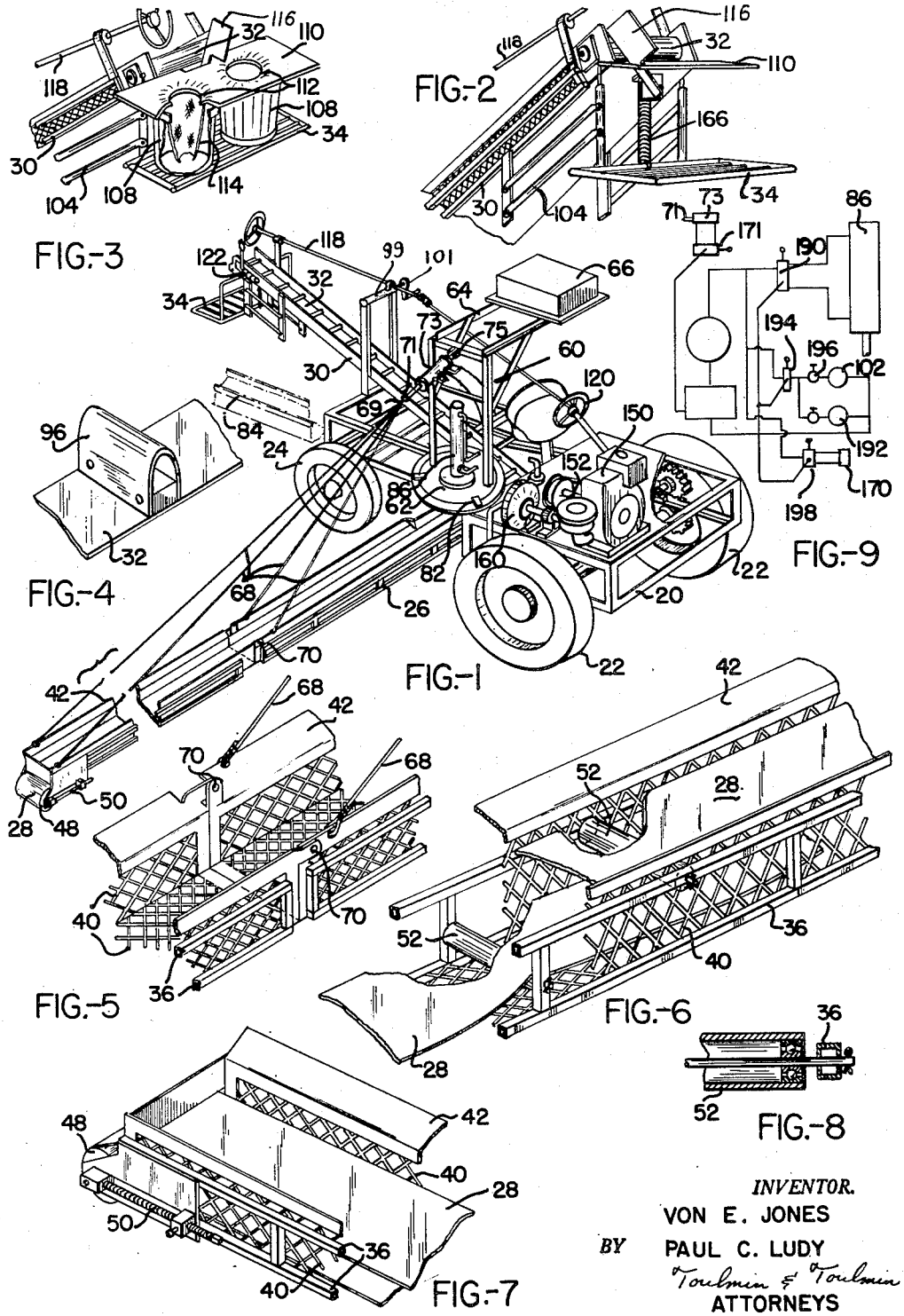
INVENTOR.
VON E. JONES
PAUL C. LUDY
BY
Toulmin & Toulmin
ATTORNEYS Feb. 26, 1957 V. E. JONES ET AL 2,782,943
MOBILE APPARATUS FOR HARVESTING CROPS
Filed May 3, 1954 3 Sheets-Sheet 2

INVENTOR.
VON E. JONES
BY PAUL C. LUDY
Toulmin & Toulmin
ATTORNEYS

Feb. 26, 1957  V. E. JONES ET AL  2,782,943
MOBILE APPARATUS FOR HARVESTING CROPS

Filed May 3, 1954  3 Sheets-Sheet 3

INVENTOR.
VON E. JONES
PAUL C. LUDY
BY Toulmin & Toulmin
ATTORNEYS

United States Patent Office 2,782,943
Patented Feb. 26, 1957

2,782,943

MOBILE APPARATUS FOR HARVESTING CROPS

Von E. Jones and Paul C. Ludy, Arcanum, Ohio, assignors to The J. C. L. Manufacturing Corporation, a corporation of Ohio Application May 3, 1954, Serial No. 427,128

9 Claims. (Cl. 214—83.1)

This invention relates to farm machinery, and particularly, to a machine for harvesting crops such as tomatoes and the like.

The harvesting machine of the present invention is particularly adapted for use in connection with the harvesting of crops that could easily be bruised in handling and also crops which involve a great deal of manual labor in collecting them in the growing field and transmitting them to a central collection point.

In the gathering of such crops as tomatoes and the like, it is customary for them to be picked manually and carried in baskets or bags to a central collection point from which they are conveyed by truck or the like to a cannery or to a further processing station. Particularly in connection with the gathering of such crops as tomatoes, it is very easy to bruise the crop when it is handled in this manner thereby detracting from its value, especially if the crop is to be canned whole, as is the case with tomatoes for a high quality product.

Having the foregoing in mind, it is a primary object of the present invention to provide a harvesting machine of the nature referred to which is extremely rapid in operation thus greatly speeding up the work of gathering a crop such as tomatoes.

A still further object of the present invention is the provision of a harvesting machine of the nature referred to which substantially eliminates any damage to the crop being gathered, and instead, delivers it in the best possible condition to a central collection point.

It is also an object of this invention to provide a harvesting machine of the nature referred to which is of substantial size but which is characterized by being capable of being collapsed, at least in parts, thus permitting the ready transporting thereof on highways and narrows roads.

A particular object of the invention is the provision of a device for harvesting crops such as tomatoes and the like, which is selfpowered and, in fact, can develop sufficient power that it can readily draw a wagon or other collecting means to which the crop harvested is delivered.

It is also an object of the invention to provide a harvesting device of the nature referred to, and a method of operation thereof, requiring the minimum amount of labor to maintain the device in operation.

Another particular object of the present invention is the provision of the harvesting device of the nature referred to which can readily be adjusted to accommodate crops of different characteristics.

There are several objectives referred to above, as well as still other objects and advantages of this invention obtained in brief, by providing a mobile wheeled unit having an engine therein for motive power and which wheeled unit carries a transversely extending boom and a longitudinally extending boom, both provided with conveyors so that crops placed in the horizontal boom will be delivered by the conveyor therein to the lower end of the longitudinally extending boom and be conveyed therealong to the rear thereof to a collection station which may comprise baskets or the like.

The apparatus is also provided with hydraulic motor means for operating the conveyors in the booms and is likewise provided with hydraulically operated adjustments for raising and lowering at least the transversely extending boom. The transversely extending boom is arranged to be collapsed against the side of the device so that it can be transported on a highway or a narrow road, if necessary.

The exact nature of the present invention will be more clearly understood upon reference to the accompanying drawings, in which:

Figure 1 is a perspective view showing a harvesting apparatus constructed according to the present invention:

Figure 2 is a perspective view showing the rear end of the longitudinally extending boom:

Figure 3 is a perspective view similar to Figure 2, but showing the manner in which the crop delivered from the rear end of the longitudinally extending boom is transferred to basket means carried by the boom:

Figure 4 is a fragmentary perspective view showing how rubber-like cleats can be provided on one or more of the conveyors in the booms for moving the crop along with the conveyor:

Figures 5, 6 and 7 are fragmentary perspective views showing details of the construction in connection with the transversely extending boom:

Figure 8 is a fragmentary view showing the arrangement of a support roller beneath the conveyor in the horizontally extending boom:

Figure 9 is a diagrammatic circuit diagram showing one form which the hydraulic control circuits of the device can take:

Figure 17:
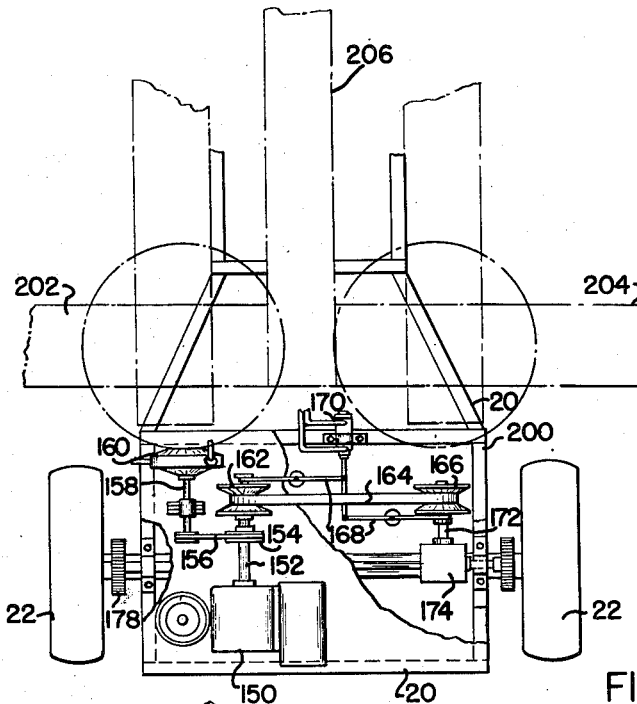
Figure 18:
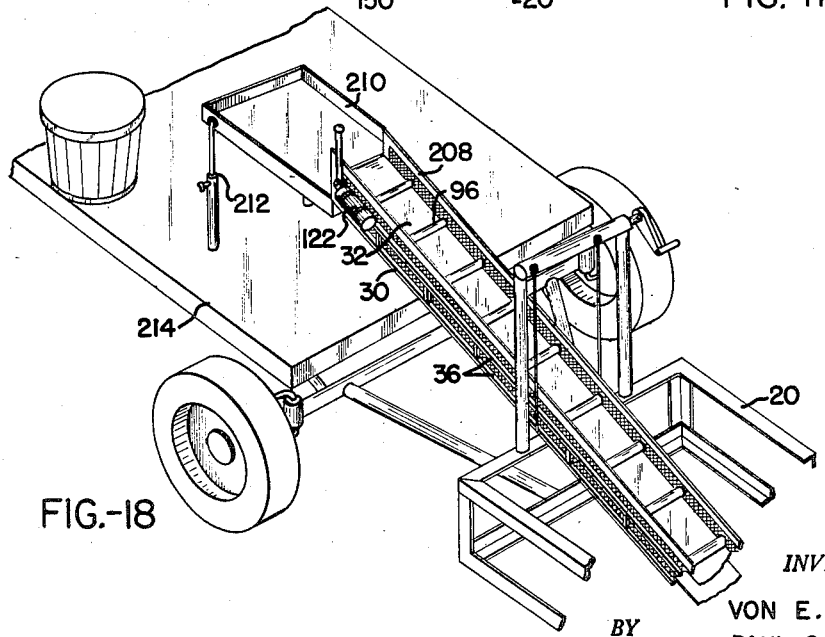

Figure 17 is a plan view and more or less diagrammatic, showing how the device of the present invention is adapted for having two transversely extending booms associated with a single longitudinally extending boom; and Figure 18 is a fragmentary perspective view showing the manner in which the gathered crop can be delivered to a grading table at the rear end of the longitudinally extending boom for being sorted and packed.

Referring to the drawings somewhat more in detail, the device as illustrated consists of a relatively light, but substantially rigid framework 20, which is provided with wheels 22 at the front end that are power-driven, and wheels 24 at the rear end which are steerable wheels. The frame supports a transversely extending boom 26 which projects laterally from the frame a distance of up to 20 to 30 feet. Boom 26 is preferably constructed of tubular metallic members so as to be light, but fairly strong, and has located therein a conveyor belt 28, the upper reach of which is driven toward the center of frame 20.

As will be seen hereinafter the inner end of the boom 26 is located adjacent the forward end of the rearwardly extending boom 30 which is likewise provided with a conveyor belt 32 that is driven so as to move the upper reach thereof rearwardly. By utilizing the boom and conveyor arrangement described it will be apparent that objects placed on conveyor 28 in boom 26 will be carried inwardly and delivered to the conveyor belt 32 at the inner end of boom 30 and then conveyed rearwardly on conveyor 32 to a collection station at the rear end of the boom which comprises a platform 34.

In further regard to boom 26, this member is constructed as is illustrated in Figures 5, 6, 7 and 11 preferably of a tubular frame 36 with expanded metal side and bottom walls as at 40. The rear side wall of the boom 26 is preferably formed with an inclined upper edge 42 which will facilitate the placing of articles in the conveyor since it is on the rear side of the conveyor that the workmen will be operating.

At the inner end of boom 26 there is rotatable mounted a drive roller 44 having connected therewith flexible shaft means 46 for driving the roller in rotation thereby to drive the conveyor belt 28. At the outer end of the boom there is an idler roller 48 adjustable longitudinally of the boom for adjusting the tension in conveyor belt 28 as by the screw threaded means 50. Boom 26 preferably has spaced therealong idler roller 52 for supporting the conveyor belt so that it runs in a substantially horizontal direction.

Additionally, adjacent the drive roller 44 there may be an additional idler roller 54 for the purpose of increasing the degree of wrap of the conveyor belt around the drive roller thus it decreases slippage of the roller on the belt.

Due to the considerable length of boom 26, it is preferable to counterbalance the boom and this can be accomplished by the structure generally indicated at 60 which consists of a frame upstanding vertically from a table 62 and having horizontal arms 64 with a platform that supports a counterweight 66. The arms 64 at the end opposite the counterweight 66 are connected by the tension elements 68 with spaced points along boom 26. These tension elements are preferably flexible and may be jointed rods or may consist of cables. The purpose of having the tension elements flexible is to permit ready collapsing of boom 26 which is accomplished by virtue of the pivot means 70 provided in about the center thereof which permits the outer end of the boom to be folded back over the inner end thereof and with the folded boom then being adapted for being turned against the side of the device so that it can be transported through fields and along relatively narrow roads, if necessary.

The tension elements 68 are advantageously arranged to meet at a point 69 which is connected with the ram 71 of a hydraulic motor 73 which has its end opposite point 69 pivotally anchored to the structure 60 as at 75. The hydraulic motor arrangement permits tilting of the transverse boom to accommodate the device to varying ground conditions as, for example, where the roadway or path along which the device is moving is substantially horizontal while the vines or plants from which the crop is being collected are disposed on a hillside. It will be understood that the particular size and arrangement of a hydraulic motor could vary considerably within the scope of the present invention.

Figure 10:
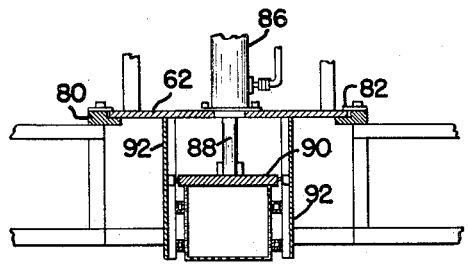
Figure 10 is a fragmentary view showing an adjustment in connection with the transversely extending boom for raising and lowering it to accommodate the device to crops of different size.
Figure 12:
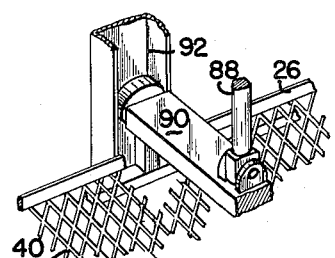
Figure 12 is a perspective view showing the arrangement of a guide associated with the fluid ram for raising and lowering the laterally extending conveyor boom.

The arrangement for rotatably supporting the boom to permit its being collapsed against the side of the device is more fully illustrated in Figures 10 and 12, wherein it will be seen that plate 62 is in the form of a turntable supported on a ring 80 mounted on frame 20 and rotatably retained therein as by the clips 82. It will be seen in Figure 1 that the rear portion of frame 20 is narrower than the front portion of the frame 20, and is offset relative to the center of the frame for the side opposite boom 26 so that the said boom can be readily folded back along the side of the frame to the dot-dash position indicated at 84 in Figure 1.

The platform 62 is likewise availed of for supporting a hydraulic motor 86 having a ram 88 extending out the bottom and connected with a bar 90 guided at the opposite ends of the channel means 92 secured to the bottom of platform 62. Bar 90 is made rigid with boom 26 so that by operating hydraulic motor 86 the said boom can be raised and lowered a substantial amount. It will be understood that the raising and lowering of the outer end of boom 26 could preferably be accomplished by adjusting the lengths of the tension elements 68 as by a turnbuckle means provided therein or some instrumentality of a like nature.

Figure 11:
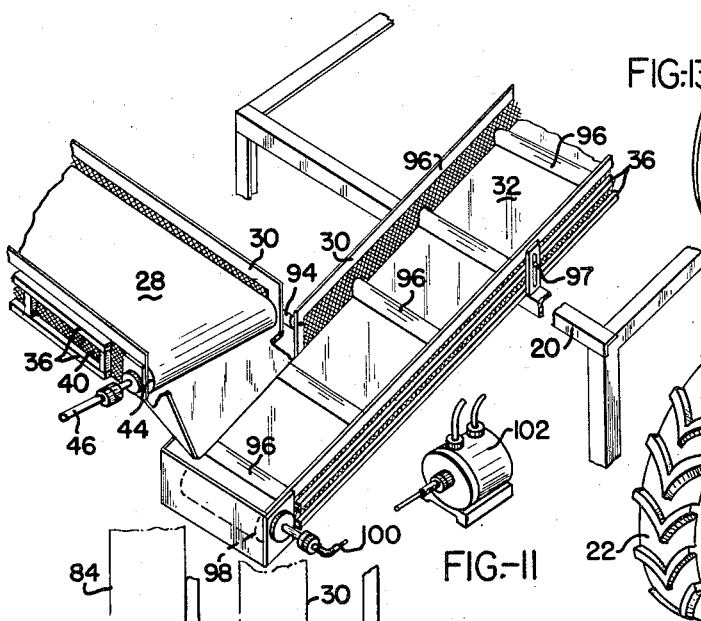
Figure 11 is a fragmentary perspective view at about the center of the machine showing the manner in which the transversely extending conveyor delivers crops to the longitudinally extending conveyor.
Figure 13:
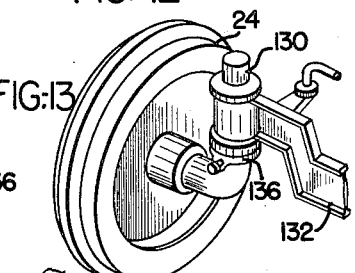
Figure 13 is a perspective view showing an adjustment associated with the steerable rear wheels of the device for raising and lowering the frame of the device relative to the ground.
Figure 16:
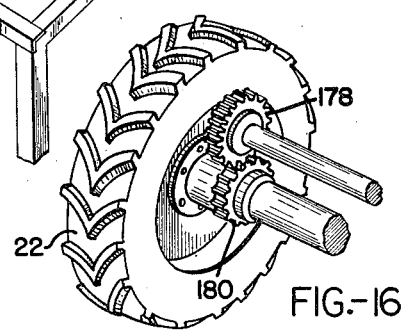
Figure 16 is a perspective view showing the manner in which the drive wheels of the device are actuated.
Figure 15:
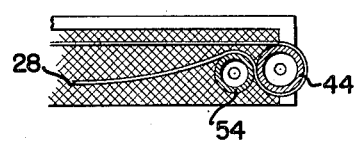
Figure 15 is a fragmentary sectional view showing the use of an idler roller for increasing the wrap of one of the conveyor belts about its drive pulley.

As will be seen in Figure 11, the inner end of boom 26 is connected with boom 30 by means of a hinge joint 94 so that raising and lowering movements of boom 26 does not change its relationship to the forward end of boom 30. Boom 30 also has an adjustable connection at 97 with frame 20 of the device so that it can readily follow raising and lowering movements of boom 26.

The hinge connection at 94 is made separable so that it can be opened when boom 26 is to be collapsed against the side of the device.

Referring now to boom 30, this element is constructed substantially the same as boom 26 except that the conveyor belt 32 in boom 30 is preferably provided with rubberlike cleats 96 which are sufficiently soft and resilient that they will not damage the crop being conveyed on conveyor belt 32 but still provide a positive movement of the crop along boom 30. Boom 30, similarly to boom 26, comprises a drive roll 98 at one end to which is connected by a flexible shaft 100, and a hydraulic motor 102.

At the rear end of boom 30 there is provided a platform 34, previously referred to, which is connected with a frame of boom 30 by the parallel motion linkage 104 with a spring 106 serving to urge platform 34 upwardly. Platform 34 is adapted for supporting baskets 108 which are located beneath an apertured platform 110 secured to the rear end of boom 30. Platform 110 has the apertures 112 therein over the baskets 108, and secured to the underside of the platform are the fabric sleeves 114 which prevent the articles delivered from the conveyor from falling into the basket with sufficient force to cause any damage thereto.

A manually deflecting member 116 diverts the articles delivered by the conveyor belt to one of the other of the apertures 112 and, in operation, the spring 106 is so adjusted that the platform 34 gradually lowers as the basket is filled so that the articles being delivered to the basket are always caught by the sleeve 114 and damage thereof prevented. As soon as the basket is filled, of course, deflector member 116 is moved to its other position and a new basket is placed on platform 34. Ordinarily, a wagon is connected with a device so that the filled basket can be placed directly therein.

As will be seen in Figure 1, the device is adapted for being driven from the rear end of boom 30 by providing the jointed steering column 118 connected with the steering wheel 120 of the vehicle to permit turning of the said steering wheel from adjacent platform 34. The boom similarly has a hydraulic control valve 122 at the rear end of boom 30 which can be used to adjust boom 26 vertically, or which can control the speed of operation of the conveyor belts.

In connection with the vertical adjustment of boom 26 it may, at times, be necessary to adjust the frame 20 of the device vertically in order to provide proper clearance from the ground or from crops thereon, and this may be accomplished at least at the rear end of frame 20 by mounting the steerable wheels 24 on angle support shafts 130 which are carried in the ends of the axles 132 and which can be adjusted vertically in the said axles by releasing screws 134 and collars 136 and adjusting the shafts 130 downwardly in the axles.

Similar adjusting means can be provided in the front end of the device if necessary, although generally the size of the drive wheels 22 will provide sufficient clearance.

Figure 14:
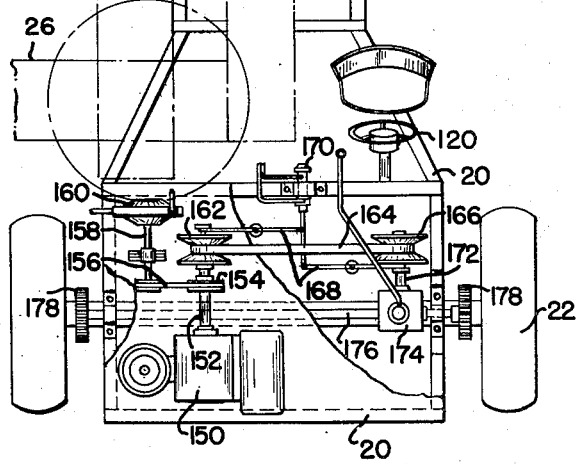
Figure 14 is a plan view showing the arrangement of the drive motor for the device and its connection with the drive wheels and the hydraulic pump which supplies motive power for actuating the conveyors and for raising and lowering the laterally extending boom.

Figure 14 shows one manner in which the various auxiliaries can be arranged in the frame of the device. In this view the drive engine, preferably an internal combustion engine is indicated at 150 and comprises an output shaft 152 mounting a pulley 154 that drives through a belt 156 to a pulley on the input shaft 158 of a hydraulic pump 160 which supplies pressure fluid for operating the conveyor motors and motor 86 which raises and lowers boom 26.

Shaft 152 also mounts a pulley 162 driven through a pulley 164 into a second pulley 166. The pulleys 162 and 164 are adjustable relative to each other to provide adjustable speed for pulley 166 and this adjustment may be accomplished by the pivoted levers 168 which are under the control of a hydraulic motor 170. Pulley 166 is fixed to a shaft 172 which is the input for a variable speed transmission 174 that drives an output shaft 176 on which are mounted the gears 178 that mesh with gears 180 associated with the drive wheels 22.

The hydraulic circuit is illustrated in Figure 9 wherein it will be seen that there is a reversing valve 190 associated with motor 86. This valve is preferably a closed center valve so that, after adjustment of motor 86, centering of valve 190 will lock the motor in place.

The conveyor motors 102 for conveyor belts 32 and 192 and conveyor belt 28 may be controlled by a single valve 194 and the relative speed of the two motors by use of a throttle valve 196 arranged in series therewith. Control valve 194 does not need to be reversing valve and can merely have opened and closed positions.

The hydraulic motor 170, which adjusts the relative size of pulleys 162 and 166, is also provided with a closed center reversing valve 198 simile to reversing valve 190 associated with motor 86.

Associated with hydraulic motor 73 for adjusting the tension elements 68 is a closed center four-way valve 171 so that the transverse boom can be tilted readily at any time.

The described arrangement is particularly advantageous for gathering crops, such as tomatoes and the like, because the device can be driven through the fields, and pickers walking along behind boom 26 can select and gather the crop and place them on a conveyor belt 28, whereupon the crop is conveyed inwardly and transferred to a conveyor belt 32 by which it is carried backwardly and upwardly to the collection station at platform 34.

It is found that crops gathered in this manner will be free from bruises, a distinct advantage over prior art methods of gathering delicate crops and, because of this, the pick is of much higher quality and is more valuable.

The pickers are able to gather more crops and the fatigue in connection with the work is substantially less. The device is capable of being manufactured at low cost and maintained at a minimum expense and, as will be appreciated, it is readily portable and readily adaptable to use in connection with vegetation of varying heights.

The longitudinal boom 30 is also adapted for being raised and lowered relative to the frame by means of the upstanding framework 99, at the top of which is a crank 101 having cable means connected therewith leading downwardly to boom 30.

The several hydraulic auxiliaries, as well as the steering mechanism, are all adapted for being controlled by a worker riding in a wagon hitched to the back of the frame, such hitch not being shown, and it will be understood that any of the control valve means, the engine throttle, and the like, could be positioned to be available at the rear end of boom 30.

In Figure 17 there is shown a modified arrangement, wherein the frame 200 of the device is adapted for supporting two laterally extending booms 202 and 204 which deliver articles placed thereon to the single longitudinally extending boom 206. The Figure 17 structure merely duplicates the lateral boom on the opposite side of the machine and would have the advantage over the Figure 1 structure of permitting the booms to be interconnected by a suitable sort of structure erected over the frame of the device, thereby eliminating the counterweight means at 66 in cases where both booms are always to be used. However, the Figure 17 arrangement provides a structure where "both lateral booms are suitably counterbalanced," and either one or both of the said lateral booms can be used as conditions dictate.

In Figure 18 there is shown a modified structure, wherein the longitudinal boom 208 delivers the articles thereon to a grading and sorting table 210, which may be carried on the end of the boom, as in the case of the platform 34 previously referred to, and which table may be provided with adjustable leg means 212 to permit at least partial support thereof on the bed of wagon 214 which is provided for receiving the hampers of the sorted pick.

It will be apparent that the sorting and grading stage could be provided at any convenient location as, for example, by means of a riding platform adjacent the inner ends of the laterally extending booms or along the longitudinally extending boom at any suitable location, but it is preferred to provide a receiving table of the nature illustrated in Figure 18 which will accommodate one or more graders, thus providing ample opportunity for the pick to be thoroughly graded thus permitting culls to be left in the field and saving transportation costs and also, in many cases, permitting the selective packing and sorting of the portion of the pick that is retained.

It will be understood that I do not wish to be limited to what has been shown and described in this application, but desire to comprehend within my invention all such changes and modifications and adaptations of the invention as may be considered to come within the scope of the appended claims.

We claim:

1. In a harvesting machine of the nature described; a mobile frame, at least one first boom extending laterally from said frame, a second boom extending rearwardly from said frame, said second boom commencing at a point below the inner end of said first boom, conveyor belts in said booms, means driving said conveyor belts so the upper reach of the conveyor belt in the lateral boom moves inwardly to convey articles to the inner end of the longitudinal boom while the upper reach of the conveyor belt in the longitudinal boom moves rearwardly to convey articles delivered thereto to the rear end thereof, means at the rear end of said longitudinal boom for receiving said articles, means for adjusting said lateral boom angularly and vertically in said frame, and means supporting said lateral boom in said frame for rotative movement thereof about a point adjacent its inner end and to the side of said longitudinal boom to dispose said lateral boom in a position substantially parallel with the longitudinal axis of said frame and beside said longitudinal boom thereby to permit movement of said device along roads and the like, said means comprising a plate rotatably supported in the frame above said point, guide means on the plate engaging the lateral boom to guide it for vertical movement beneath the plate, and support means on the plate connected with the boom to adjust it vertically thereon.

2. In a harvesting machine of the nature described; a mobile frame, at least one first boom extending laterally from said frame, a second boom extending rearwardly from said frame, said second boom commencing at a point below the inner end of said first boom, conveyor belts in said booms, means driving said conveyor belts so the upper reach of the conveyor belt in the lateral boom moves inwardly to convey articles to the inner end of the longitudinal boom while the upper reach of the conveyor belt in the longitudinal boom moves rearwardly to convey articles delivered thereto to the rear end thereof, means at the rear end of said longitudinal boom for receiving said articles, means for adjusting said lateral boom angularly in said frame, a pivot plate supporting said lateral boom at the inner end thereof in said frame for rotative movement of the boom about a point adjacent its inner end to dispose said lateral boom in a position substantially parallel with the longitudinal axis of said frame and beside said longitudinal boom thereby to permit movement of said device along roads and the like, said lateral boom being joined intermediate its ends for being folded over, and a hydraulic motor mounted on said plate connected therethrough with said lateral boom operable for raising and lowering the boom.

3. In a machine of the nature described; a frame, a boom structure extending laterally from said frame, a rotatable support plate in said frame adjacent the inner end of said boom, vertical guide means extending downwardly from the plate engaging said boom, and means supporting the boom on the plate operable to adjust the boom vertically on the plate, said plate when rotated causing rotative movement of said boom on the frame to dispose the boom in position substantially parallel with the longitudinal axis of said frame, said boom being jointed intermediate its ends for being folded over when positioned along the side of said frame, a conveyor belt in said boom, and means for driving said conveyor belt.

4. In a machine of the nature described; a frame, a first boom extending laterally from said frame, a second boom extending longitudinally rearwardly and upwardly from said frame, said second boom being tiltable in the frame, the inner ends of said booms being adjacent to each other with the inner end of the longitudinal boom being slightly beneath the inner end of the lateral boom, means supporting the inner end of said lateral boom for raising and lowering and rotative movement on said frame, a hinge connection between the inner ends of said booms whereby the longitudinal boom will tilt in the frame to follow the lateral boom in the raising and lowering movements thereof, and said hinge connection being separable to permit the said rotative movement of said lateral boom independently of said longitudinal boom.

5. In a machine of the nature described; a frame, a first boom extending laterally from said frame, a second boom extending longitudinally rearwardly and upwardly from said frame, said second boom being tiltable in the frame, the inner ends of said booms being adjacent to each other with the inner end of the longitudinal boom being slightly beneath the inner end of the lateral boom, means supporting said lateral boom for raising and lowering and rotative movement on said frame, a hinge connection between the inner ends of said booms whereby the longitudinal boom will tilt in the frame to follow the lateral boom in the raising and lowering movements thereof, and said hinge connection being separable to permit the said rotative movement of said lateral boom independently of said longitudinal boom, said booms having conveyor belts therein, motors carried by the frame, and drive cables flexibly connecting said motors with said conveyor belts for driving the upper reach of the belt in the lateral boom inwardly and the upper reach of the conveyor belt in the longitudinal boom rearwardly in all positions of adjustments of said booms.

6. In a machine of the nature described; a frame, a first boom extending laterally from said frame, a second boom extending longitudinally rearwardly and upwardly from said frame, the inner ends of said booms being adjacent to each other with the inner end of the longitudinal boom being slightly beneath the inner end of the lateral boom, means supporting said lateral boom for raising and lowering and rotative movement on said frame, a hinge connection between the inner ends of said booms whereby the longitudinal boom will follow the lateral boom in the raising and lowering movements thereof, said hinge joint being separable to permit the said rotative movement of said lateral boom independently of said longitudinal boom, said booms having conveyor belts therein, drive means flexibly connected with said conveyor belts for driving the upper reach of the belt in the lateral boom inwardly and the upper reach of the conveyor belt in the longitudinal boom rearwardly in all adjusted positions of said booms, the said conveyor belts in the longitudinally extending boom having rubber like cleats thereon, and there being means at the rear end of said longitudinal boom for receiving articles conveyed to the said rear end thereof by the conveyor belt therein.

7. In a harvesting machine of the nature described; a frame having ground wheels, laterally and longitudinally extending booms carried by said frame with the inner end of said lateral boom being slightly above and to one side of the inner end of said longitudinal boom, conveyor belt means in said booms for moving articles inwardly of the lateral boom and rearwardly of the longitudinal boom, means for driving said belts, a platform at the rear end of said longitudinal boom for supporting basket means to receive articles delivered to the rear end of said longitudinal boom, said platform receiving the said baskets in side by side relation, and a deflector member adjustable for deflecting the articles into one or the other of the basket means, said platform being resiliently supported on the rear end of said longitudinal boom so that it will gradually lower as articles are delivered to said basket means.

8. In a machine of the nature referred to; a frame, a boom extending rearwardly and upwardly from said frame and having conveyor belt means therein for conveying articles to the rear end of said boom, a platform resiliently supported on the rear end of said boom for supporting baskets for receiving articles delivered to the rear end of said boom, a plate having a pair of apertures therein at the rear end of said boom to which the said articles are delivered, a deflector member associated with said plate for deflecting the articles into one of the other of said apertures, and a fabric tube on the bottom side of said plate to register with each said aperture for braking the fall of articles dropping through said apertures to said baskets.

9. In a machine of the nature described; a frame, lateral and longitudinal booms carried by and projecting from said frame with the inner ends of said booms being in adjacent relation, said longitudinal boom being inclined upwardly from a point beneath the inner end of the lateral boom to a point substantially above the lateral boom, conveyor belt means in said booms for conveying articles inwardly of the lateral boom and delivering them to the lower end of the longitudinal boom and then upwardly rearwardly therealong to the rear end of said longitudinal boom, means pivotally supporting said lateral boom adjacent its inner end to permit swinging movement of the said boom to dispose the length thereof in a position parallel with the longitudinal axis of said frame and beside said longitudinal boom, and said frame being offset inwardly rearwardly of said supporting means for receiving said boom.

(References on following page)

References Cited in the file of this patent

UNITED STATES PATENTS

| | | |
|---|---|---|
| 1,245,948 | Murray | Nov. 6, 1917 |
| 1,325,602 | Albright | Dec. 23, 1919 |
| 1,504,846 | Tarkington | Aug. 12, 1924 |
| 2,224,789 | Kurtz et al. | Dec. 10, 1940 |
| 2,321,387 | Jackson | June 8, 1943 |
| 2,395,124 | Jelderks | Feb. 19, 1946 |
| 2,536,507 | Lang et al. | Jan. 2, 1951 |
| 2,576,991 | Bainbridge et al. | Dec. 4, 1951 |
| 2,584,361 | Morine | Feb. 5, 1952 |
| 2,590,965 | Huston | Apr. 1, 1952 |
| 2,647,525 | Duda et al. | Aug. 4, 1953 |